Nov. 25, 1924.
W. C. TYLER
1,516,583
AUTOMOBILE HEADLIGHT ATTACHMENT
Filed Oct. 22, 1923
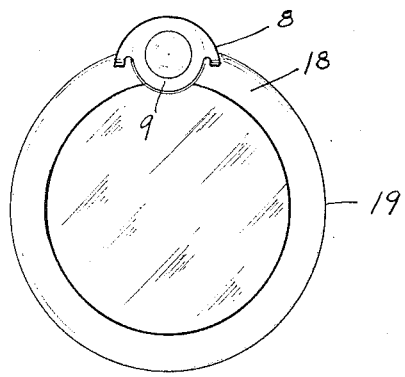
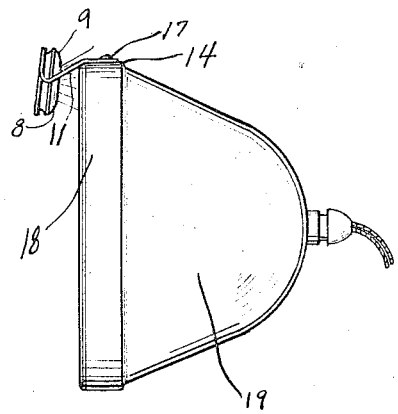
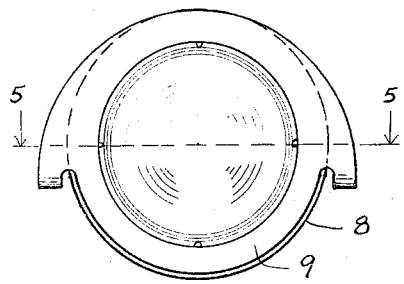
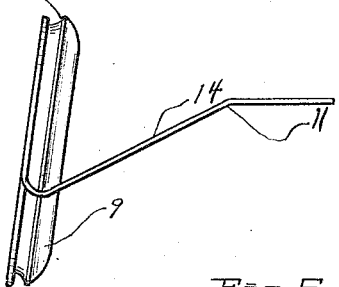
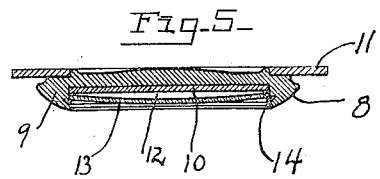
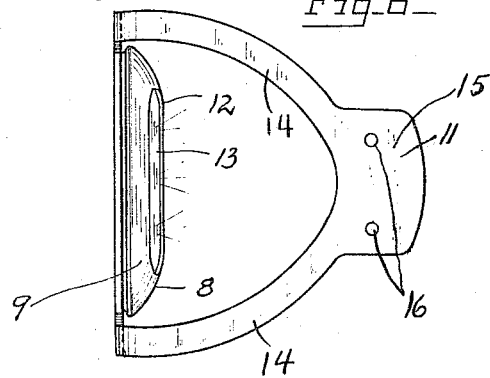
INVENTOR.
William C. Tyler.
BY
Morsell, Keeney & Morsell
ATTORNEY.

Patented Nov. 25, 1924.

1,516,583

UNITED STATES PATENT OFFICE.

WILLIAM C. TYLER, OF RACINE, WISCONSIN.

AUTOMOBILE HEADLIGHT ATTACHMENT.

Application filed October 22, 1923. Serial No. 670,083.

*To all whom it may concern:*

Be it known that I, WILLIAM C. TYLER, a citizen of the United States, and resident of Racine, in the county of Racine and State of Wisconsin, have invented new and useful Improvements in Automobile Headlight Attachments, of which the following is a description, reference being had to the accompanying drawings, which are a part of this specification.

This invention relates to improvements in automobile headlight attachments, and more particularly to attachments adapted to indicate whether or not the headlights are illuminated or in proper working order.

In driving automobiles, it is somewhat difficult for the driver to tell whether or not both headlights are lit, and it is the principal object of the present invention to overcome this objectionable feature by providing reflectors mounted on the headlights of the automobile and so arranged that the light from the headlights will be reflected to the driver of the automobile.

A further object of the invention is to provide devices of the class described which can be permanently attached to the headlights of an automobile.

A further object of the invention is to provide headlight attachments which are very neat and attractive in appearance.

A further object of the invention is to provide headlight attachments which are of very simple construction, are strong and durable, are inexpensive to manufacture, and are well adapted for the purpose described.

With the above and other objects in view, the invention consists of the improved headlight attachment, and its parts and combinations as set forth in the claims and all equivalents thereof.

Referring now more particularly to the accompanying drawing in which the same reference characters indicate the same parts in all of the views:

Fig. 1 is a front view of an automobile headlight with the improved attachment mounted thereon;

Fig. 2 is a side view thereof;

Fig. 3 is a rear view of the attachment itself, and on a larger scale;

Fig. 4 is a side view thereof;

Fig. 5 is a sectional view taken on line 5—5 of Fig. 3; and

Fig. 6 is an inverted view of the attachment.

Referring to the drawing it will be seen that the numeral 8 indicates an improved headlight attachment which is approximately disc-shaped in form. The device is formed of metal or any other desired material and in general comprises a frame portion 9, a reflector 10, and an attaching bracket 11. In the front of the frame portion a circular recess 12 is formed which receives a reflector 10 formed of mirror glass or polished metal. Immediately adjacent said reflector within the recess, a convex piece of glass 13 of circular shape is located, the circumference of said glass being the same as the circumference of said recess in order to insure a tight fit. The purpose of the glass is to protect the reflector from weather and exposure so that the reflector will not lose any of its reflecting qualities. Adjacent said glass and on the outside thereof a piece of curved spring wire 14 is provided to removably maintain the glass and reflector within the frame recess. The attaching bracket 11 may be formed as a part of the frame portion, and, as shown, it is formed integral with the frame portion and has bifurcated portions 14 disposed at an angle with respect to the frame, terminating in a flat attaching portion 15. Said portion has therein apertures 16 to permit the utilization of screws 17 or other convenient means to attach the device to the bezel 18 of an automobile headlight 19. It should be observed that the device is positioned so that a slight angle is formed between it and the plane of the face of the headlight. By this arrangement when the headlights are lighted they will be reflected to the driver of the automobile and it will be immediately apparent whether or not the headlights are operating properly.

From the foregoing description it will be seen that the improved automobile headlight attachment is of very simple and novel construction, and is well adapted for the purpose described.

What I claim as my invention is:

1. A headlight attachment, comprising a disc-shaped frame member, a reflector disposed in a recess formed in said frame member, a protective transparent member positioned adjacent the outer face of the reflector, and an attaching bracket bent at an angle with respect to the frame member and affording means for connecting the attachment to the bezel of a headlight to intercept rays of light therefrom and reflect them rearwardly.

2. A headlight attachment, comprising a disc-shaped frame member, a reflector disposed in a recess formed in said frame member, a protective transparent member positioned adjacent the outer face of the reflector, means for removably holding said reflector and transparent member within said recess in said frame, and an attaching bracket bent at an angle with respect to the frame member and affording means for connecting the attachment to the bezel of a headlight to intercept rays of light therefrom and reflect them rearwardly.

3. A headlight attachment, comprising a disc-shaped frame member, a reflector disposed in a recess formed in one face of said frame member, a protective transparent member positioned adjacent the outer face of said reflector, means for removably holding said reflector and said transparent member within said recess in said frame, and an attaching bracket formed integral with the frame and affording means for connecting the attachment to the upper surface of the bezel of a headlight at a slight angle with respect to the plane of the front of the headlight, to intercept rays of light from said headlight and reflect them rearwardly.

In testimony whereof I affix my signature.

WILLIAM C. TYLER.